(12) United States Patent
Xu et al.

(10) Patent No.: US 12,094,481 B2
(45) Date of Patent: Sep. 17, 2024

(54) ADL-UFE: ALL DEEP LEARNING UNIFIED FRONT-END SYSTEM

(71) Applicant: TENCENT AMERICA LLC, Palo Alto, CA (US)

(72) Inventors: Yong Xu, Bellevue, WA (US); Meng Yu, Bellevue, WA (US); Shi-Xiong Zhang, Redmond, WA (US); Dong Yu, Bellevue, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 8 days.

(21) Appl. No.: 17/455,497

(22) Filed: Nov. 18, 2021

(65) Prior Publication Data
US 2023/0154480 A1 May 18, 2023

(51) Int. Cl.
*G10L 21/0208* (2013.01)
*G06N 3/044* (2023.01)
(Continued)

(52) U.S. Cl.
CPC ............................... *G10L 21/0208* (2013.01)

(58) Field of Classification Search
CPC . G10L 21/0208; G10L 21/0232; G10L 21/02; G10L 21/00; G10L 21/0202; G10L 25/00; G10L 25/78; G10L 25/93; G10L 2021/00; G10L 2021/02; G10L 2021/0208; G10L 2021/02082; G10L 2025/00; G10L 2025/93; G10L 2025/932; G10L 2025/935; G10L 2025/937; G10L 15/16; G10L 15/063; G10L 15/20; G10L 19/008; H04M 9/082; H04M 9/08; H04B 3/23;
H04B 3/20; G06F 3/011; G06F 3/017; G06N 3/08; G06N 20/10; H04R 3/04; H04R 25/552; H04R 25/505
USPC ...... 704/12, 10, 15, 21, 22, 24, 30, 31, 270, 704/200, 202, 224, 225, 226, 231, 232, 704/233, 234, 236, 246, 250, 266, 269,
(Continued)

(56) References Cited

U.S. PATENT DOCUMENTS 9,595,997 B1   3/2017 Yang
2006/0130637 A1*  6/2006 Crebouw ............ G10L 19/0204
                                                     84/603
(Continued)

OTHER PUBLICATIONS

International Search Report dated Jan. 17, 2023 in Application No. PCT/US22/43739.
(Continued)

*Primary Examiner* — Leshui Zhang
(74) *Attorney, Agent, or Firm* — Sughrue Mion, PLLC

(57) ABSTRACT

There is included a method and apparatus comprising computer code for generating enhanced target speech from audio data, performed by a computing device, the method comprising: receiving audio data corresponding to one or more speakers; generating estimated an target speech, an estimated noise, and an estimated echo simultaneously based on the audio data using a jointly trained complex ratio mask; predicting frame-level multi-tap time-frequency (T-F) spatio-temporal-echo filter weights based on the estimated target speech, the estimated noise, and the estimated echo using a trained neural network model; and predicting enhanced target speech based on the frame-level multi-tap T-F spatio-temporal-echo filter weights.

20 Claims, 8 Drawing Sheets

(51) Int. Cl.
  *G06N 3/08* (2023.01)
  *G10L 21/0216* (2013.01)
  *G10L 21/0264* (2013.01)
  *G10L 25/30* (2013.01)
(58) Field of Classification Search
  USPC ......... 704/270.1, 271, 272, 275; 706/12, 10, 706/15, 21, 22, 24, 30, 31
  See application file for complete search history.

(56) References Cited

U.S. PATENT DOCUMENTS

| | | |
|---|---|---|
| 2016/0234610 A1 | 8/2016 | Jensen et al. |
| 2019/0045065 A1 | 2/2019 | Hera et al. |
| 2020/0027444 A1* | 1/2020 | Prabhavalkar ........ G10L 15/183 |
| 2020/0312346 A1* | 10/2020 | Fazeli ................. G10L 21/0208 |
| 2020/0365152 A1* | 11/2020 | Han ........................ G10L 15/02 |

OTHER PUBLICATIONS

Written Opinion dated Jan. 17, 2023 in Application No. PCT/US22/43739.

\* cited by examiner

ADL-UFE: ALL DEEP LEARNING UNIFIED FRONT-END SYSTEM

FIELD

Embodiments of the present disclosure relate to data and/or signal processing, more specifically speech processing.

BACKGROUND

Speech enhancement and speech separation have attracted much research attention because they are often encountered in real-world scenarios like virtual meetings, smart speakers, and communication systems. Classical methods in of speech enhancement and speech separation use a cascade of technologies to build the system. However, such a cascade of technologies and methods is often disparate and cannot achieve an optimal solution.

The error generated in the beginning of the system may be propagated to the following stages and eventually throughout the system. They may have high-level residual noise and echo due to some unreal assumptions and some numerical problems. Some methods may have some non-linear distortion which is harmful for the back-end automatic speech recognition (ASR) system.

SUMMARY

Typical methods for speech enhancement and/or speech separation include a pipeline of independent technologies and/or parts of modules together to build the final system leading to suboptimal solutions. In such systems, error generated using early on in the pipeline is propagated throughout the system. Further, some systems may have high-level residual noise and echo due to inaccurate assumptions and/or mathematical infeasibilities. Other end-to-end learning approaches have non-linear distortion on the front end which negatively affects the automatic speech recognition (ASR) system on the back-end. The present disclosure is directed to improved speech enhancement and/or speech separation with less residual noise and/or residual echo. Further, the methods and apparatus in the present disclosure lead to less non-linear distortion compared to some purely "black box" methods. Thus, because the methods and apparatus in the present disclosure reduce non-linear distortion, they provide higher ASR accuracy. The methods and apparatus in the present disclosure provide better speech enhancement and lower speech recognition word error rate.

Embodiments of the present disclosure include a method and an apparatus for generating enhanced target speech from audio data, performed by a computing device, the method comprising: receiving audio data corresponding to one or more speakers; generating an estimated target speech, an estimated noise, and an estimated echo simultaneously based on the audio data using a jointly trained complex ratio mask; predicting frame-level multi-tap time-frequency (T-F) spatio-temporal-echo filter weights based on the estimated target speech, the estimated noise, and the estimated echo using a trained neural network model; and predicting enhanced target speech based on the frame-level multi-tap T-F spatio-temporal-echo filter weights.

According to embodiments, the jointly trained complex ratio mask is a multi-headed attention based neural network model, and wherein the same jointly trained complex ratio mask is used to generate the estimated target speech, the estimated noise, and the estimated echo.

According to embodiments, the generation of the estimated target speech, the estimated noise, and the estimated echo using the jointly trained complex ratio mask comprises applying a complex ratio filter to a plurality of nearby time and frequency bins associated with the audio data.

According to embodiments, the generation of the estimated target speech comprises applying a complex ratio filter, wherein the complex ratio filter is based on a speech complex ratio filter as applied to a corresponding shifted version of the plurality of nearby time and frequency bins associated with the audio data.

According to embodiments, wherein the generation of the estimated noise comprises applying a complex ratio filter, wherein the complex ratio filter is based on a noise complex ratio filter as applied to a corresponding shifted version of the plurality of nearby time and frequency bins associated with the audio data.

According to embodiments, the predicting of the frame-level multi-tap T-F spatio-temporal-echo filter weights based on the estimated target speech, the estimated noise, and the estimated echo comprises: expanding the estimated target speech, the estimated noise, and the estimated echo; generating a first intermediate concatenation based on a concatenation of the estimated target speech and the estimated echo; generating a second intermediate concatenation based on a concatenation of the estimated noise and the estimated echo; performing a first normalization, wherein the first normalization comprises layer normalization of the first intermediate concatenation; performing a second normalization, wherein the second normalization comprises layer normalization of the second intermediate concatenation; and generating the frame-level multi-tap T-F spatio-temporal-echo filter weights based on the first normalization and the second normalization using the trained neural network model.

According to embodiments, the trained neural network model is a multi-tap multi-head attention based recurrent neural network.

According to embodiments, the predicting of the enhanced target speech based on the frame-level multi-tap T-F spatio-temporal-echo filter weights, the audio data, and the estimated echo.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
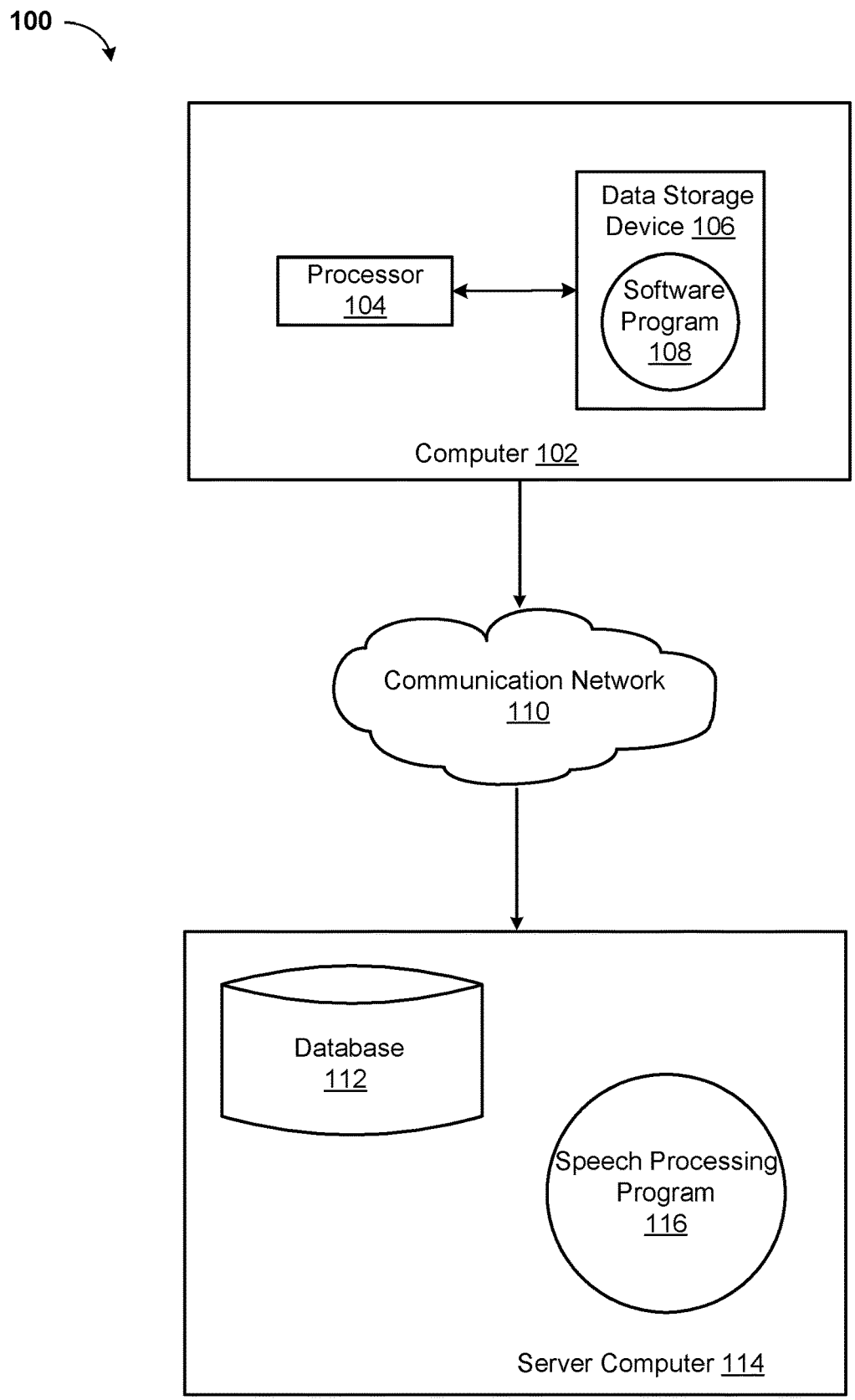
FIG. 1 illustrates a networked computer environment according to embodiments of the present disclosure.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

The present disclosure relates to the field of data processing, and more particularly to speech recognition, speech separation, and/or speech enhancement. The present disclosure provides a system, method and computer program to, among other things, separate the speech of target speakers from a noisy speech mixture using an all-neural network approach. Therefore, some embodiments have the capacity to improve the field of computing by allowing for improved speech enhancement, speech separation, and/or dereverberation tasks by a computer. Moreover, the disclosed method, system, and computer-readable medium may be used to improve the performance of automated speech recognition in areas such as hearing aids and communication.

Speech enhancement and speech separation methods have attracted much research attention. Techniques such as speech denoising, dereverberation, beamforming, and acoustic echo cancellation (AEC) are often used improve the target speech quality and intelligibility in a real-world front-end system. However, they are often used in a pipeline, by combining different techniques and/or modules together, leading to a suboptimal solution. Error generated at the beginning of the pipeline is propagated downstream.

Some signal processing based methods have been developed to integrate related art beam formers (e.g., MVDR) and acoustic echo cancellation (AEC) algorithms. E.g., a weighted power minimization distortion-less response convolutional beam former (WPD) for the joint separation, denoising and dereverberation. However, the residual noise level in those methods is still high, especially at low signal-to-noise ratios or in situations with overlapped speech. Further, the matrix inverse of the noise covariance matrix and principal component analysis (PCA) of the target speech covariance matrix, which are involved in the MVDR and neural networks, are not stable and may lead to suboptimal results. According to embodiments of the present disclosure the matrix inversion and principal component analysis (PCA) involved in a related art beam former (e.g., MVDR) could be implicitly replaced by the powerful multi-tap multi-head attention RNN model that utilizes the weighted information from all previous frames locally and globally and does not need any heuristic updating factors between consecutive frames as needed in recursive MVDR beam former based approaches.

Recently, some deep learning assisted joint optimization approaches are also proposed to handle abovementioned problems. However, these neural network based methods have high-levels of residual noise and echo due to erroneous assumptions and mathematical instability. Even proposed end-to-end neural network based method to jointly address problems related to AEC and denoising have some non-linear distortion which is harmful for the back-end automatic speech recognition (ASR) system.

The present disclosure is directed to solving the above mentioned problems with speech processing, including speech separation and/or speech enhancement. With the renaissance of neural networks, better objective performance can be achieved using deep learning methods. The present disclosure aims to reduce the noise while keeping the target speech undistorted. The present disclosure, with its end-to-end neural networks (NN) based time-frequency (T-F) mask estimator can help greatly reduce the word error rate (WER) of ASR systems with less amount of distortion, with improvements in residual noise problems since chunk- or utterance-level beamforming weights are not optimal for noise reduction. Further, using multi-head attention RNN models, the present disclosure effectively addresses the nonlinearity and time shift that exists in the echo.

Embodiments of the present disclosure disclose jointly trained front-end system based on multi-head attention recurrent neural network (RNN) model for joint AEC, denoising, dereverberation and separation. The echo reference and the estimated signal covariance matrix are jointly modeled to efficiently remove the echo. Multi-head attention RNN is also proposed to learn the multi-tap and multi-channel cross-correlation. Spatio-temporal-echo filter is then predicted to remove echo, interfering speech, background noise and reverberation and generate enhanced target speech. Embodiments of the present disclosure achieve less residual noise and residual echo. Embodiments of the present disclosure also lead to less non-linear distortion when compared to some purely "black-box" methods.

Embodiments of the present disclosure disclose a novel all deep learning based unified front-end framework (ADL-UFE). According to embodiments of the present disclosure, the speech processing system may conduct joint optimization for the acoustic echo cancellation (AEC), speech denoising, speech separation and speech dereverberation simultaneously to estimate speech, noise, and echo. According to embodiments, the joint optimization may be performed simultaneously using a jointly trained mask estimator, which may include a complex ratio filter.

According to embodiments, the estimated target speech, estimated noise, and estimated echo may be multi-tap expanded before being input into a multi-head self-attentive RNN to better utilize the cross-frame correlation in the echo and target speech. Further, an echo reference and the estimated target speech may be modeled together and/or simultaneously using a multi-head attention RNN to learn the frame-level T-F spatio-temporal-echo filter weights. The frame-level T-F spatio-temporal-echo filter weights combined with the audio data and echo reference may be used to generate enhanced target speech from noisy audio data.

According to embodiments of the present disclosure, a convolutional-1D gated recurrent unit RNN (Conv1D-GRU-RNN) based mask estimator may be used to estimate the echo, speech and noise from the noisy audio data. According to embodiments of the present disclosure, a multi-tap multi-head attentive RNN beam former (RNNBF) may be used to predict frame-level multi-tap T-F spatio-temporal-echo filter weights. The RNNBF may use the estimated target speech, estimated noise, and estimated echo to predict frame-level multi-tap T-F spatio-temporal-echo filter weights. The frame-level multi-tap T-F spatio-temporal-echo filter weights may be used to generate the enhanced target speech from the noisy audio data.

The use of RNNs (e.g., RNNBFs) in estimating speech, echo, and noise from noisy data and generating enhanced target speech lends itself well to real-world applications such as virtual meetings, smart cars, hearing aids, etc., because it will significantly improve the performance of ASR, wake word detection, hearing aids and communication.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

FIG. 1 illustrates a functional block diagram of a networked computer environment illustrating a speech processing system 100 (hereinafter "system") for separating speech of target speakers using an all-neural network approach. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 6 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for speech processing is enabled to run a Speech Processing Program 116 (hereinafter "program") that may interact with a database 112. The Speech Processing Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger speech processing program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Figure 2:
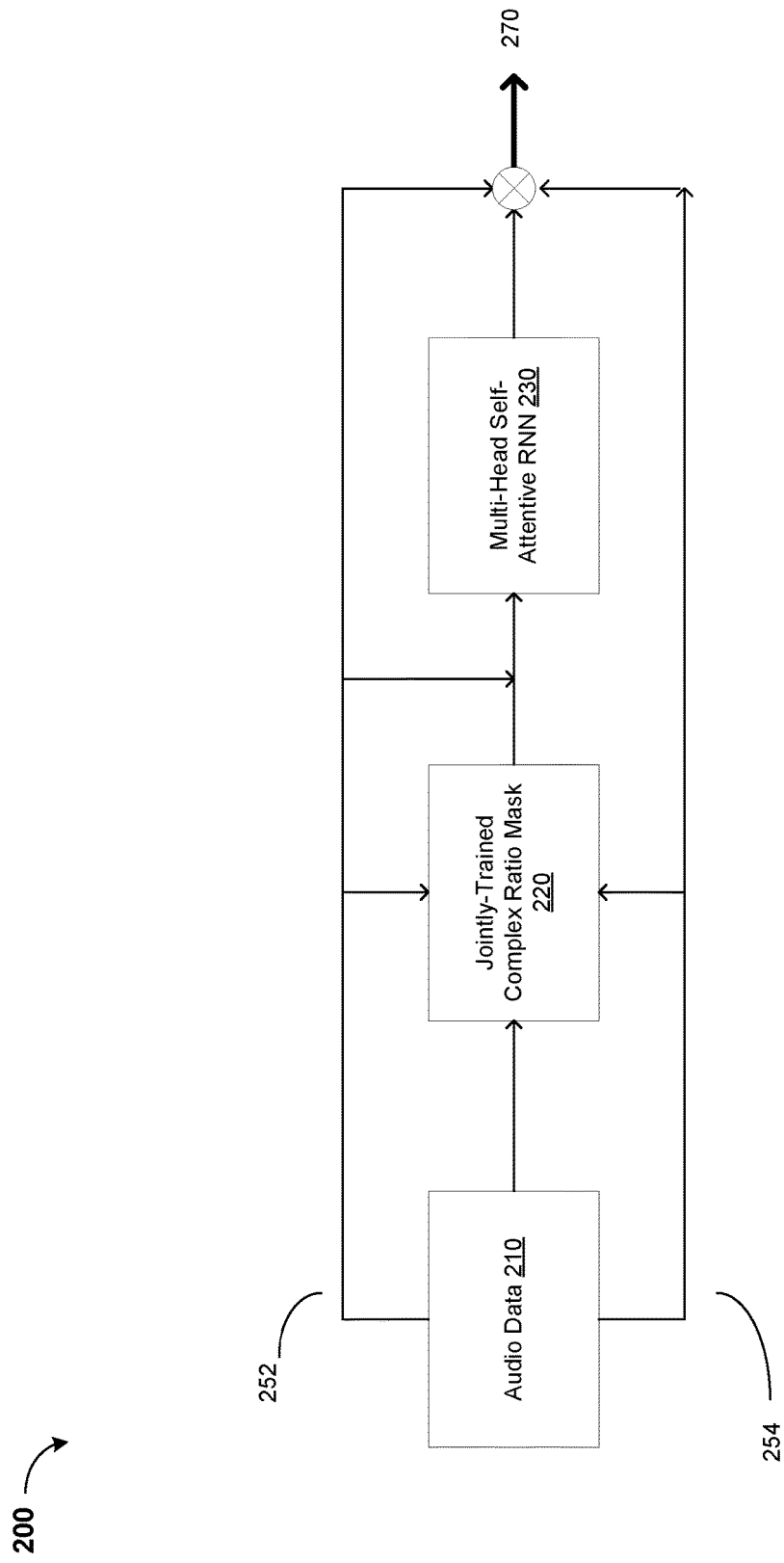
FIG. 2 is an exemplary speech processing system according to embodiments of the present disclosure.

FIG. 2 illustrates an exemplary speech processing system 200 for speech separation and/or speech enhancement to one or more embodiments of the present disclosure.

As shown in FIG. 2, the exemplary speech processing system includes audio data 210, jointly trained complex ratio mask 220, multi-head self-attentive RNN 230, and enhanced target speech 270.

The audio data 210 may include noisy speech mixture 254 corresponding to one or more speakers, echo reference 252 corresponding to one or more speakers, and speaker-independent features (e.g., log-power spectra (LPS) and inter-aural phase difference (IPD)) and speaker-dependent feature (e.g., directional feature d(θ)).

According to embodiments of the present disclosure, audio data includes noisy speech mixtures corresponding to one or more speakers without information about the location of different speakers. But with enough context about the situation, a rough estimate of the global directions of arrivals (DOAs) may be made. As an example, we may not know the exact locations of different speakers in the car. But we can roughly estimate the global DOAs of the four acoustic areas in the car as shown in FIG. 5. Further, if the location of the microphone and/or microphone array may be estimated, a location guided directional feature (DF) d(θ) may be used to extract the target speech from the specific DOA. DF may calculate the cosine similarity between the target steering vector v(θ) and IPDs. The estimated mask or filter will help to calculate the abovementioned speech, noise and echo using this audio data.

According to embodiments of the present disclosure, the noisy speech mixture 254 may include target speech, echo signal, and interfering noise components over a plurality of channels.

Consider a noisy speech mixture $y=[y_1, y_2, \ldots, y_M]^T$ recorded with an M-channel near-end microphone array. Let s represent the target speech, d may represent the echo signal and n may denote the interfering noise (including interfering speech and background noise) with M channels, then we have $$y(t)=s(t)*h_{target}(t)+d(t)+n(t) \quad \text{equation (1)}.$$

Where $h_{target}(t)$ may be the room impulse response (RIR) of the target speaker to the microphone array. Further consider $$d(t)=e(t)*h_{echo}(t)+d_{nonlinear}(t) \quad \text{equation (2)}.$$

Where e(t) may be the echo reference signal of the far-end speaker, $h_{echo}(t)$ may be the room impulse response (RIR) or acoustic echo path of the louder speaker to the microphone array (including the louder speaker response), and $d_{nonlinear}(t)$ may be the nonlinear component which may be introduced by the louder speaker.

The signals may be transformed into the time-frequency domain by the short-time Fourier transform (STFT):

$$Y(t,f)=S(t,f) \cdot H_{target}(t,f)+D(t,f)+N(t,f) \quad \text{equation (3)}.$$

Where (t, f) may indicate the time and frequency indices of the acoustic signals in the time-frequency (T-F) domain.

According to embodiments of the present disclosure, the enhanced, separated, and/or dereverberated target speech S(t, f) may be predicted from the near-end M-channel mixture Y(t, f) with the echo reference signal E(t, f) as at least a part of the input.

Generating and/or predicting the enhanced target speech may have the some difficulties. In some situations, the echo reference signal E(t, f) may be different from the received echo signal D(t, f) by the near-end M-channel microphone array because D(t, f) may consist of linear distortion ($h_{echo}(t)$) and nonlinear distortion ($d_{nonlinear}(t)$). In other situations, the room impulse response $H_{target}(t, f)$ may need to be removed, and the noise N(t, f) may contain the interfering speech and diffused background noise from multiple random locations.

According to embodiments, some methods to solve the above-mentioned problems may include using a mask based minimum variance distortion-less response (MVDR) beam former, where the separated speech may be obtained as $$\hat{s}_{MDVR}(t,f)=h(f)^H Y(t,f) \quad \text{equation (4)}.$$

Where $h(f) \in \mathbb{C}^M$ may represent the MVDR weights at frequency index f and H may stand for the Hermitian operator. The goal of the MVDR beam former may be to minimize the power of the noise while keeping the target speech undistorted, which may be formulated as:

$$h_{MVDR} = \underset{h}{\text{argmin}} \ h^H \Phi_{NN} h \quad \text{equation (5)}$$

$$\text{s.t. } h^H v = 1.$$

Where $\Phi_{NN}$ may stand for the covariance matrix of the noise power density spectrum (PSD) and $v(f) \in \mathbb{C}^M$ may denote the steering vector of the target speech. Different solutions may be used to derive the MVDR beam forming weights. One solution may be based on the steering vector and may be derived by applying principal component analysis (PCA) on the speech covariance matrix. Another solution may be derived based on the reference channel selection.

$$h(f)^{v1} = \frac{\Phi_{NN}^{-1}(f)v(f)}{v(f)^H \Phi_{NN}^{-1}(f)v(f)}, \quad \text{equations (6) \& (7) respectively}$$

$$h(f) \in \mathbb{C}^M$$

$$h(f)^{v2} = \frac{\Phi_{NN}^{-1}(f)\Phi_{SS}(f)}{\text{Trace}(\Phi_{NN}^{-1}(f)\Phi_{SS}(f))} u.$$

Where $\Phi_{SS}$ may represent the covariance matrix of the speech PSD, and $u \in \mathbb{C}^M$ may be the one-hot vector selecting the reference microphone channel. In some instances, the matrix inversion and PCA are not stable especially when jointly trained with neural networks.

A complex ratio mask (denoted as cRM) may be used to estimate the target speech accurately with less amount of phase distortion, which benefits human listeners. According to embodiments of the present disclosure, the estimated speech $S_{CRM}$ and speech covariance matrix $\Phi_{SS}$ can be computed as:

$$\hat{S}_{cRM}(t, f) = cRM_S(t, f) * Y(t, f) \quad \text{equations (8) \& (9) respectively}$$

$$\Phi_{SS}(f) = \frac{\sum_{t=1}^{T} \hat{S}_{cRM}(t, f)\hat{S}_{cRM}^B(t, f)}{\sum_{t=1}^{T} cRM_S^B(t, f)cRM_S(t, f)}.$$

Where * may denote the complex multiplier and $cRM_S$ may represent the estimated cRM for speech target. The noise covariance matrix $\Phi_{NN}$ may be obtained in a similar way. However, the covariance matrix Φ derived here may be on the utterance level which is not optimal for each frame, resulting in high level of residual noise. The matrix inversion involved in a related art beam former (e.g., MVDR) has always suffered from numerical instability problems.

According to embodiments of the present disclosure, a multi-tap multi-head self-attentive RNN may be used for unified front-end signal processing and overcome the above-mentioned problems. The matrix inversion and principal component analysis (PCA) involved in a related art beam former (e.g., MVDR) may be implicitly replaced by the powerful multi-tap multi-head self-attentive RNN model which is superior to a GRU-RNN model. An advantage of using a multi-tap multi-head self-attentive RNN is that it may utilize the weighted information from all previous frames locally and globally. Thus, the multi-tap multi-head self-attentive RNN model does not need any heuristic updating factors between consecutive frames as needed in recursive MVDR beam former-cased approaches.

According to embodiments in the present disclosure, to better utilize nearby T-F information and stabilize the first order estimated target speech, estimated noise, and estimated echo, a complex ratio filtering method may be used to estimate the speech, echo, and noise components. According to embodiments in the present disclosure, a deep learning based jointly trained complex ratio mask 220 may be used to estimate complex ratio masks and/or complex ratio filters used to generate the estimated target speech, estimated noise, and estimated echo. In some embodiments, the estimated target speech, estimated noise, and estimated echo may be generated simultaneously using subsets of the same complex ratio mask and/or filter. In some embodiments, the estimated target speech, estimated noise, and estimated echo may be generated simultaneously using complex ratio masks and/or filters derived specifically for the estimated target speech, estimated noise, and estimated echo respectively. In some embodiments, a multi-tap multi-head self-attentive RNN may be used to derive the one or more complex ratio masks and/or filters. In some embodiments, a convolutional-1D gated recurrent unit RNN (Conv1D-GRU-RNN) based mask estimator may be used to estimate the estimated target speech, estimated noise, and estimated echo.

For each T-F bin, the cRF may be applied to its K×L nearby bins where K and L represent the number of nearby time and frequency bins.

$$\hat{S}(t,f) = \sum_{\tau_1=-K}^{\tau_1=K} \sum_{\tau_2=-K}^{\tau_2=K} cRF_S(t,f,\tau_1,\tau_2) * Y(t+\tau_1, f+\tau_2) \quad \text{equation (10)}$$

Where, $\hat{S}(t, f)$ may indicate the estimated multi-channel speech using the speech complex ratio filter $cRF_S$. The cRF may be equivalent to K×K number of $cRM_S$ that each applies to the corresponding shifted version (i.e., along time and frequency axes) of the noisy spectrogram.

$\hat{N}(t, f)$ may indicate the estimated multi-channel noise using the noise complex ratio filter $cRF_N$. Similarly $cRF_E$ may be used to estimate the actual near-end echo signal $\hat{E}(t, f)$.

$$\hat{N}(t,f) = \sum_{\tau_1=-K}^{\tau_1=K} \sum_{\tau_2=-K}^{\tau_2=K} cRF_N(t,f,\tau_1,\tau_2) * Y(t+\tau_1, f+\tau_2) \quad \text{equation (11)}$$

$$\hat{E}(t,f) = \sum_{\tau_1=-K}^{\tau_1=K} \sum_{\tau_2=-K}^{\tau_2=K} cRF_E(t,f,\tau_1,\tau_2) * E(t+\tau_1, f+\tau_2) \quad \text{Equation (12)}$$

According to embodiments of the present disclosure, the estimated target speech, estimated noise, and estimated echo may be multi-tap expanded. According to some embodiments, the expanded estimated target speech and estimated echo may be concatenated into a first intermediate concatenation. The expanded estimated noise and estimated echo may be concatenated into a second intermediate concatenation.

As an example, the expanded estimated target speech and estimated echo may be concatenated into $Z_S(t, f)$. The expanded estimated noise and estimated echo may be concatenated into $Z_N(t, f)$.

$$Z_S(t,f)=[\hat{S}(t-\tau_1,f) \ldots \hat{S}(t,f), \hat{E}(t-\tau_1,f) \ldots \hat{E}(t,f) \quad \text{equation (13)}$$

$$Z_N(t,f)=[\hat{N}(t-\tau_1,f) \ldots \hat{N}(t,f), \hat{E}(t-\tau_1,f) \ldots \hat{E}(t,f) \quad \text{equation (14)}$$

According to embodiments of the present disclosure, the intermediate concatenations may be flattened and/or normalized. A first layer normalization may be performed using the first intermediate concatenation based on the expanded estimated target speech and estimated echo. A second layer normalization may be performed using the second intermediate concatenation based on the expanded estimated noise and estimated echo.

As an example, concatenated $Z_S(t, f)$ and $Z_N(t, f)$ may be flattened or layer normalized. In some embodiments, the layer normalizations may be performed prior to using the multi-head self-attentive RNNBF 230 to determine and/or generate the frame-level multi-tap T-F level spatio-temporal-echo filter weights. As an $$Z'_S(t,f)=\text{LayerNorm}(Z_S(t,f)) \quad \text{equation (15)}$$

$$Z'_N(t,f)=\text{LayerNorm}(Z_N(t,f)) \quad \text{equation (16)}$$

The layer normalized concatenated $Z'_S(t, f)$ and $Z'_N(t, f)$ may be input into the multi-head self-attentive RNNBF 230. The multi-head self-attentive RNNBF 230 may be used to determine and/or generate the frame-level multi-tap T-F spatio-temporal-echo filter weights based on the layer normalized concatenated $Z'_S(t, f)$ and $Z'_N(t, f)$. Using a multi-head self-attentive RNN beam former (RNN-BF) learns high-order cross-correlation across multi-frame and multi-channel more efficiently.

$$[w(t-\tau_1,f) \ldots w(t,f), w_e(t-\tau_1,f) \ldots w_e(t,f)]=\text{MA-RNN-BF}([Z'_S(t,f),Z'_N(t,f)]) \quad \text{equation (17)}$$

Based on the frame-level multi-tap T-F spatio-temporal-echo filter weights generated using the multi-head self-attentive RNNBF 230, the noisy speech mixture 254, and the echo reference 252 enhanced target speech 270 may be predicted and/or generated as $$S^{(i)}(t,f)=[w(t-\tau_1,f) \ldots w(t,f), w_e(t-\tau_1,f) \ldots w_e(t,f)]^{H*}$$
$$[Y(t-\tau_1,f) \ldots Y(t,f), E(t-\tau_1,f) \ldots E(t,f)] \quad \text{equation (18).}$$

Where (i) indicates the specific target source. Multiple target sources could be estimated simultaneously with one unified model.

Figure 3:
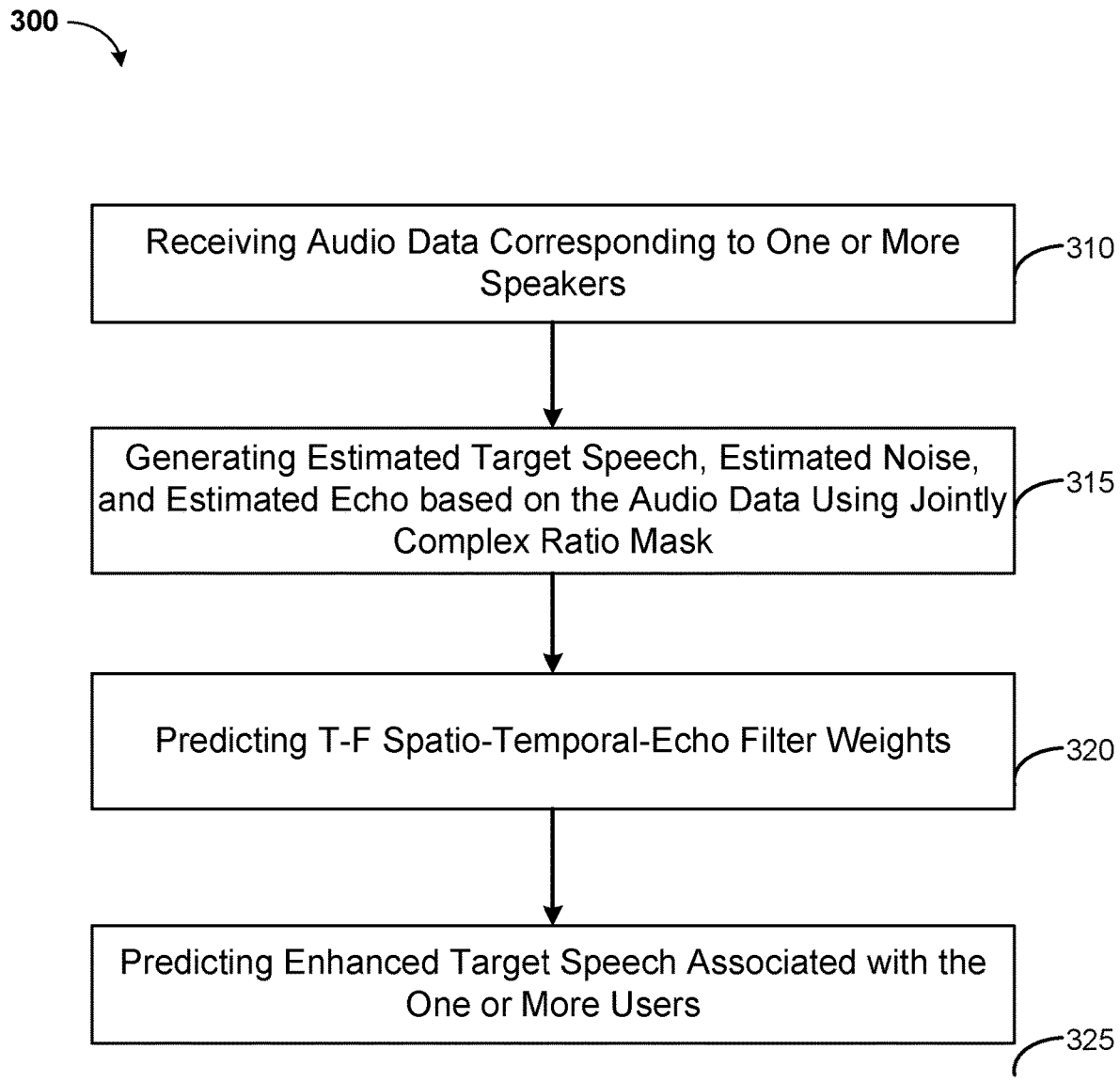
FIG. 3 is an operational flowchart illustrating speech separation and/or enhancement according to embodiments of the present disclosure.

FIG. 3 illustrates an example process 300 for speech processing, including speech separation and/or speech enhancement according to embodiments in the present disclosure.

At operation 310, audio data corresponding to one or more speakers may be received. As an example, audio data 210 may be received by the speech processing system 200. The received audio data may include noisy speech mixture 254, echo reference 252, and other speaker independent components.

At operation 320, estimated target speech, estimated noise, and estimated echo may be simultaneously generated based on the audio data using jointly trained complex ratio mask. As an example, estimated target speech, estimated noise, and estimated echo may be simultaneously generated using the jointly trained complex ratio mask 220. According to some embodiments, the jointly trained complex ratio mask is a multi-headed attention based neural network model, and wherein the same jointly trained complex ratio mask is used to generate the estimated target speech, the estimated noise, and the estimated echo.

According to embodiments of the present disclosure, the generation of the estimated target speech, the estimated noise, and the estimated echo using the jointly trained complex ratio mask may include applying a complex ratio filter to a plurality of nearby time and frequency bins associated with the audio data. According to some embodiments, the complex ratio filter applied for each of the estimated target speech, estimated echo, and estimated noise may be a subset a jointly trained and derived complex ratio mask as applied to a subset of the plurality of a plurality of nearby time and frequency bins associated with the audio data.

According to embodiments of the present disclosure, the generation of the estimated target speech may include applying a complex ratio filter, wherein the complex ratio filter may be based on a speech complex ratio filter as applied to a corresponding shifted version of the plurality of nearby time and frequency bins associated with the audio data. According to embodiments of the present disclosure, the generation of the estimated noise may include applying a complex ratio filter, wherein the complex ratio filter may be based on a noise complex ratio filter as applied to a corresponding shifted version of the plurality of nearby time and frequency bins associated with the audio data.

At operation 330, the estimated target speech, the estimated noise, and the estimated echo may be used to predict frame-level multi-tap T-F spatio-temporal-echo filter weights based on the estimated target speech, the estimated noise, and the estimated echo using a trained neural network model. As an example, the estimated target speech, the estimated noise, and the estimated generated using the jointly trained complex ratio mask 220 may be used to predict frame-level multi-tap T-F spatio-temporal-echo filter weights using the multi-head self-attentive RNN 230.

At operation 340, the predicted frame-level multi-tap T-F spatio-temporal-echo filter weights may be used to generate and/or predict enhanced target speech corresponding to the one or more speakers. As an example, the predicted frame-level multi-tap T-F spatio-temporal-echo filter weights, the noisy speech mixture 254, and the echo reference 252 may be used to generate and/or predict the enhanced target speech 270.

Figure 4:
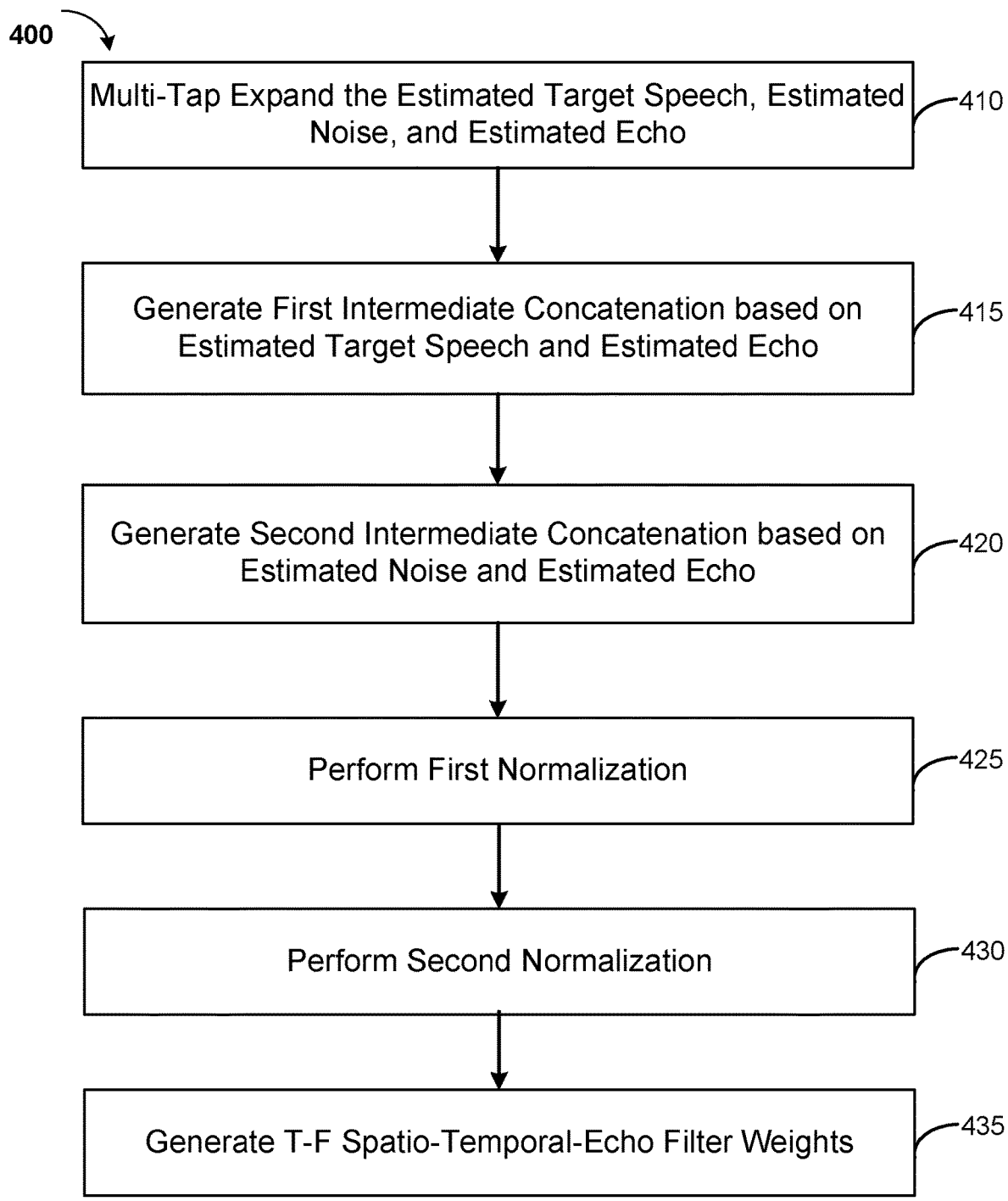
FIG. 4 is an operational flowchart illustrating speech separation and/or enhancement according to embodiments of the present disclosure.

FIG. 4 illustrates an example process 400 for generating enhanced target speech according to embodiments in the present disclosure.

At operation 410, the estimated target speech, the estimated noise, and the estimated echo may be multi-tap expanded. As an example, estimated target speech, the estimated noise, and the estimated echo generated using the jointly trained complex ratio mask 220 may be multi-tap expanded.

At operation 415, a first intermediate concatenation may be generated based on the estimated target speech and estimated echo. As an example, the expanded estimated target speech and estimated echo may be concatenated into a first intermediate concatenation At operation 420, a second intermediate concatenation may be generated based on the estimated target speech and estimated echo. As an example, expanded estimated noise and estimated echo may be concatenated into a second intermediate concatenation At operation 425, a first normalization may be performed, wherein the first normalization may include layer normalization of the first intermediate concatenation. As an example, the first normalization may be performed using the first intermediate concatenation based on the expanded estimated target speech and estimated echo.

At operation 430, a second normalization may be performed, wherein the second normalization may include layer normalization of the second intermediate concatenation. As an example, the second normalization may be performed using the second intermediate concatenation based on the expanded estimated noise and estimated echo.

At operation 435, frame-level multi-tap T-F spatio-temporal-echo filter weights may be generated using the trained neural network model. According to some embodiments, the trained neural network model is a multi-tap multi-head attention based recurrent neural network. As an example, multi-head self-attentive RNN 230 may be used to generate frame-level multi-tap T-F spatio-temporal-echo filter weights. The frame-level multi-tap T-F spatio-temporal-echo filter weights, the audio data, and the estimated echo may then be used to predict and/or generate the enhanced target speech 270.

Figure 5:
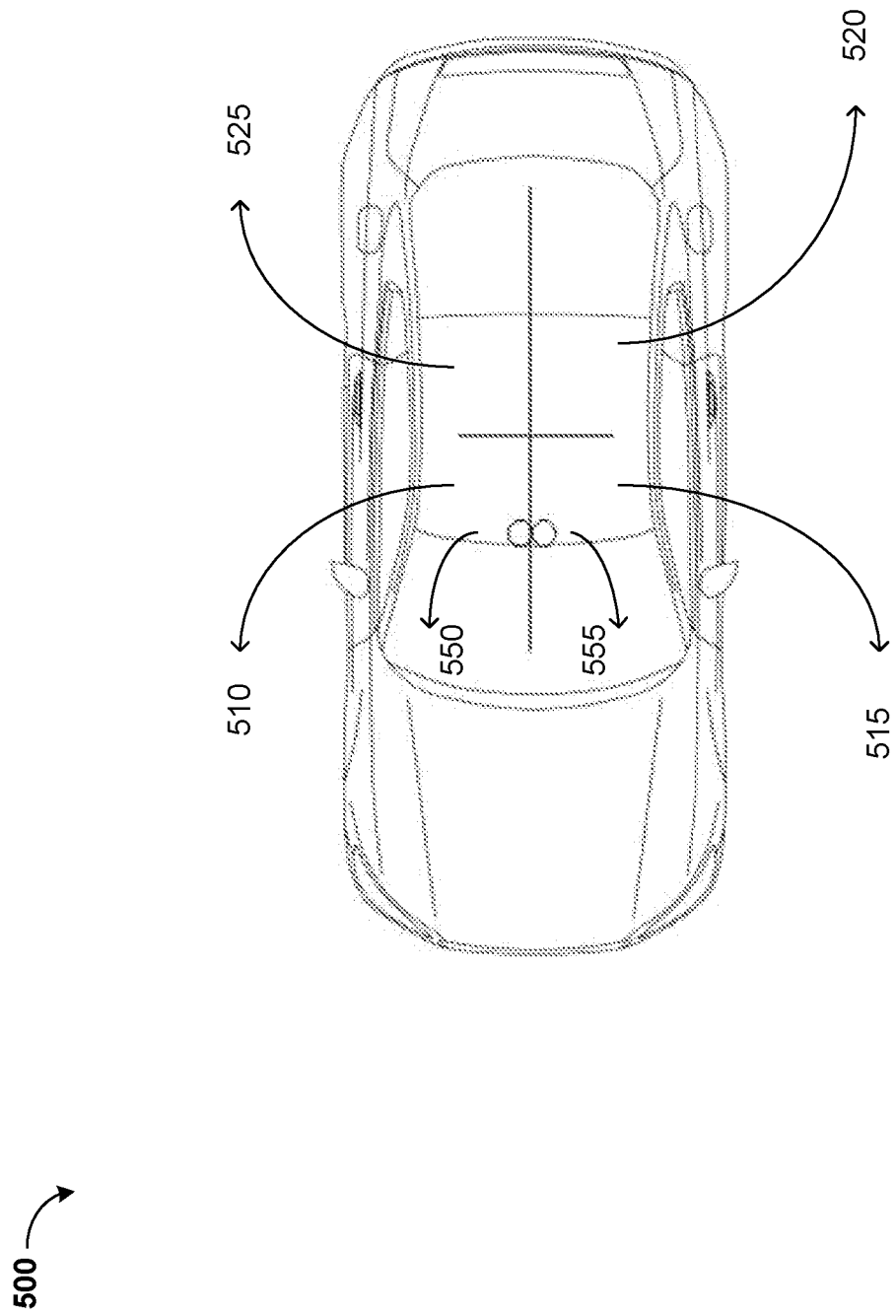
FIG. 5 is an exemplary embodiment of speech separation and/or speech enhancement in a real-world setting.

FIG. 5 illustrates an example application in a car 500 according to the present embodiments.

As shown in FIG. 5, the car 500 includes four acoustic areas 510, 515, 520, and 525, and a two microphone array 550 and 555.

Often in real-world situations, the exact locations of different speakers in the car may not be known, which causes problems for speech separation and/or speech enhancement corresponding to one or more speakers. However, as seen in car 500, the car 500 may be divided into four acoustic areas 510, 515, 520, and 525. Using the four acoustic areas 510, 515, 520, and 525, the global direction of arrivals (DOAs) of the four acoustic areas in the car may be roughly estimated. The roughly estimated global DOAs of the four acoustic areas 510, 515, 520, and 525 may be used for informing the speech processing system 200 to extract the enhanced target speech 270 from the multi-talker noisy speech mixture 254.

Further, audio data 210 may also include speaker-independent features (e.g., log-power spectra (LPS) and inter-aural phase difference (IPD)) and speaker-dependent feature (e.g., directional feature d(θ)). The two microphone array 550 and 555 may be located in the front of the car 500. A location guided directional feature (DF) d(θ) may be used to extract the target speech from the specific DOA. DF may calculate the cosine similarity between the target steering vector v(θ) and IPDs.

Figure 6:
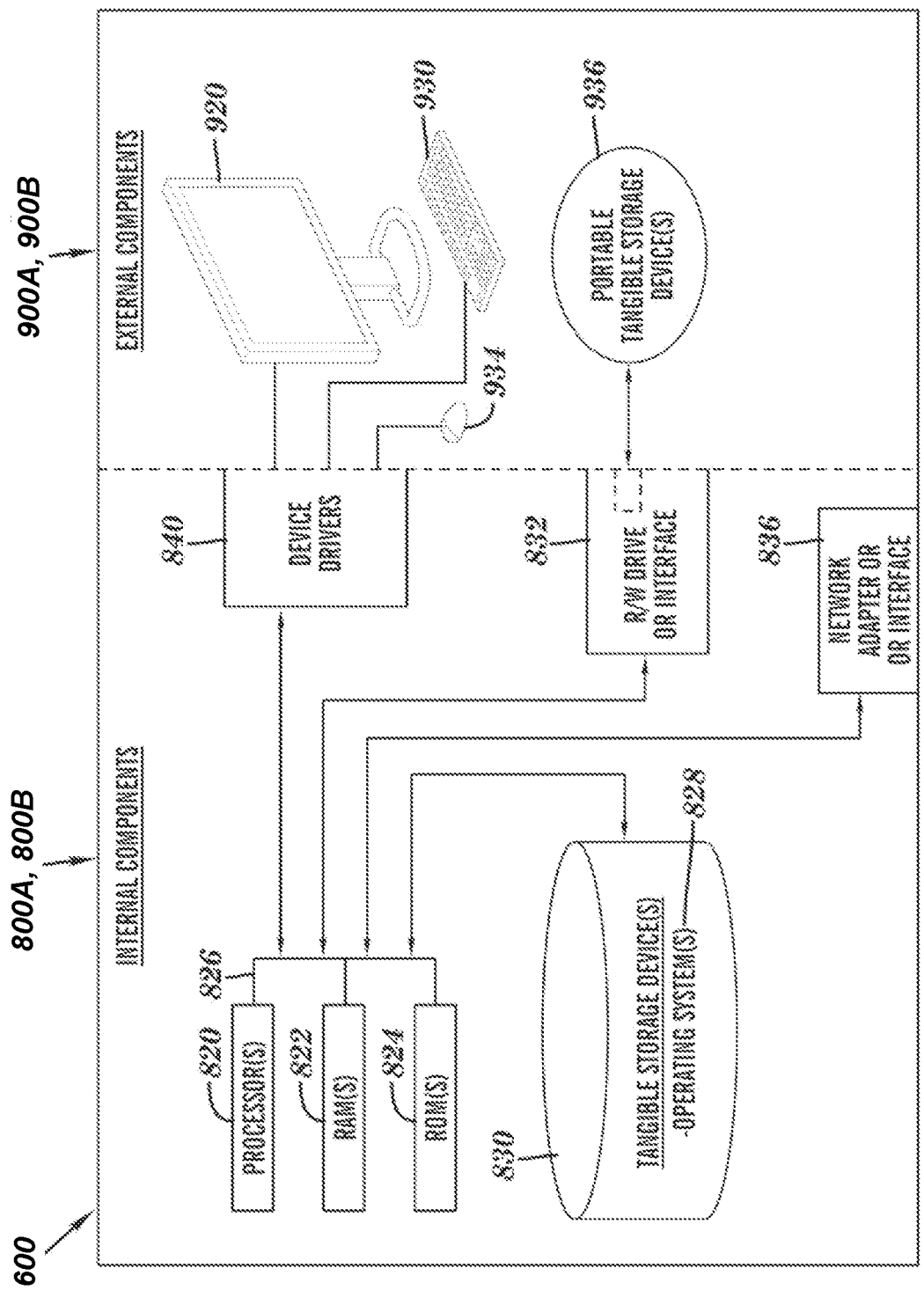
FIG. 6 is a block diagram of internal and external components of computers and servers depicted in FIG. 1 according to at least one embodiment.

FIG. 6 is a block diagram 600 of internal and external components of computers depicted in FIG. 1 in accordance with an illustrative embodiment. It should be appreciated that FIG. 6 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 6. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Speech Processing Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Speech Processing Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Speech Processing Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Speech Processing Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
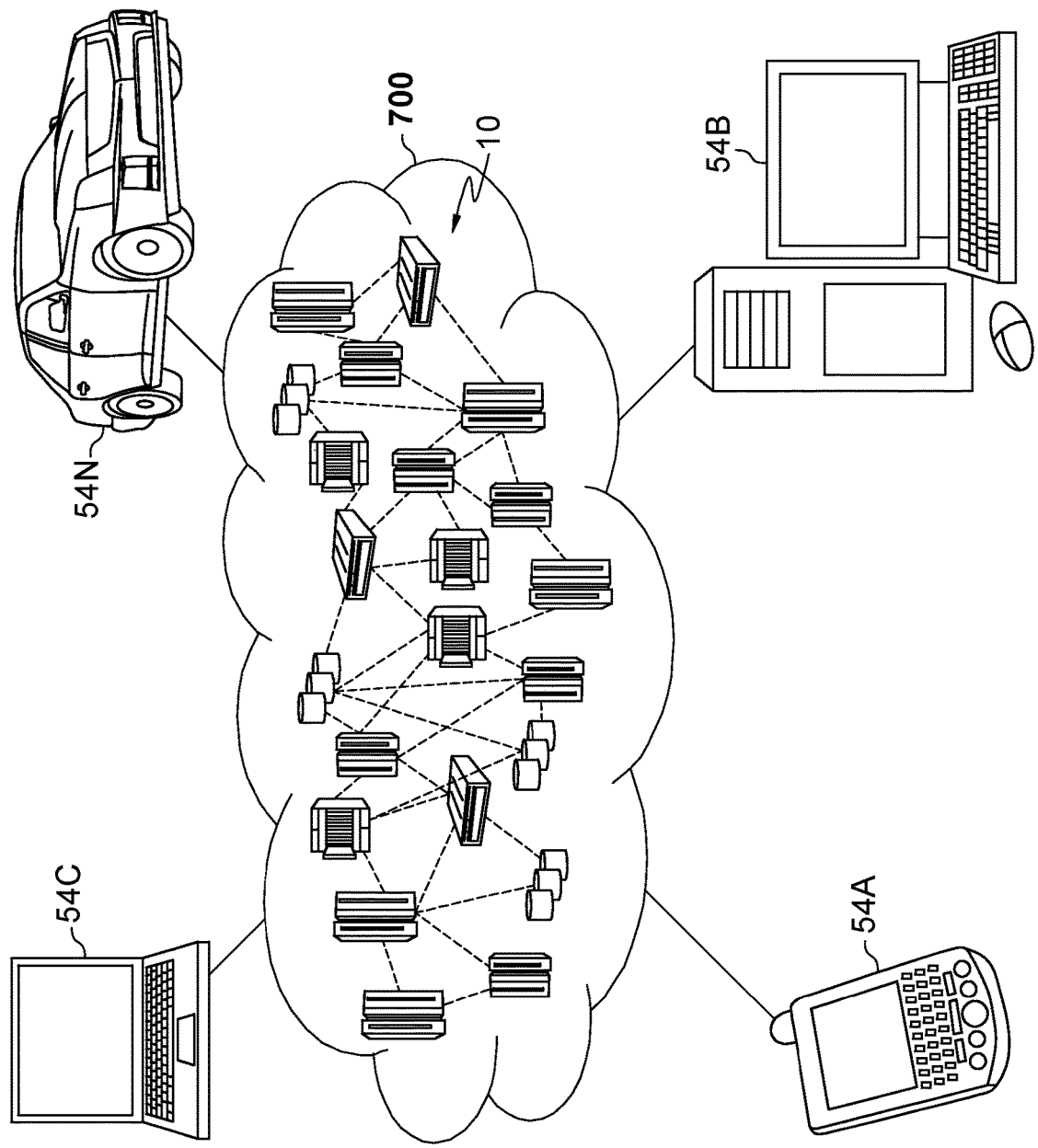
FIG. 7 is a block diagram of an illustrative cloud computing environment including the computer system depicted in FIG. 1, according to at least one embodiment.

Referring to FIG. 7, illustrative cloud computing environment 700 is depicted. As shown, cloud computing environment 700 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 54A-N shown in FIG. 7 are intended to be illustrative only and that cloud computing nodes 10 and cloud computing environment 700 can communicate with any type of computerized device over any type of network and/or network addressable connection (e.g., using a web browser).

Figure 8:
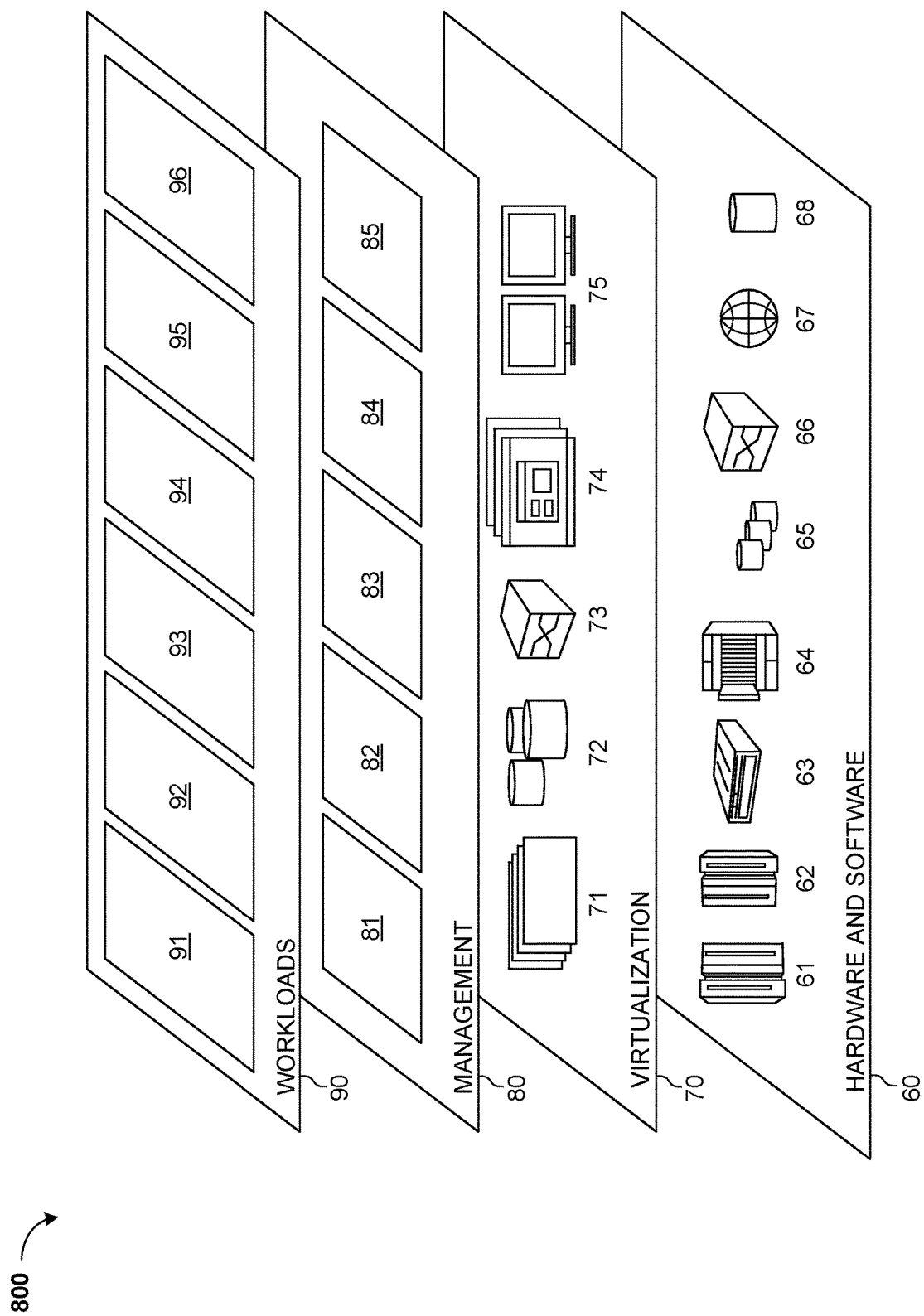
FIG. 8 is a block diagram of functional layers of the illustrative cloud computing environment of FIG. 7, according to at least one embodiment.

Referring to FIG. 8, a set of functional abstraction layers 800 provided by cloud computing environment 700 (FIG. 7) is shown. It should be understood in advance that the components, layers, and functions shown in FIG. 8 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Speech Processing 96. Speech Processing 96 may separate the speech of target speakers using an all neural network approach.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating enhanced target speech from audio data, performed by a computing device, the method comprising:
receiving audio data corresponding to one or more speakers;
generating an estimated target speech, an estimated noise, and an estimated echo simultaneously based on the audio data using a jointly trained complex ratio mask;
predicting frame-level multi-tap time-frequency (T-F) spatio-temporal-echo filter weights using a first intermediate concatenation generated by concatenating the estimated target speech and the estimated echo and a second intermediate concatenation by concatenating the estimated noise and the estimated echo using a trained neural network model,
wherein the estimated target speech and the estimated echo are jointly modeled using the trained neural network model; and
predicting enhanced target speech based on the frame-level multi-tap T-F spatio-temporal-echo filter weights.

2. The method of claim 1, wherein the jointly trained complex ratio mask is a multi-headed attention based neural network model, and wherein the same jointly trained complex ratio mask is used to generate the estimated target speech, the estimated noise, and the estimated echo.

3. The method of claim 1, wherein the generation of the estimated target speech, the estimated noise, and the estimated echo using the jointly trained complex ratio mask comprises:
applying a complex ratio filter to a plurality of nearby time and frequency bins associated with the audio data.

4. The method of claim 1, wherein the generation of the estimated target speech comprises applying a complex ratio filter, wherein the complex ratio filter is based on a speech complex ratio filter as applied to a corresponding shifted version of a plurality of nearby time and frequency bins associated with the audio data.

5. The method of claim 1, wherein the generation of the estimated noise comprises applying a complex ratio filter, wherein the complex ratio filter is based on a noise complex ratio filter as applied to a corresponding shifted version of a plurality of nearby time and frequency bins associated with the audio data.

6. The method of claim 1, wherein the predicting of the frame-level multi-tap T-F spatio-temporal-echo filter weights comprises:
performing a first normalization, wherein the first normalization comprises layer normalization of the first intermediate concatenation;
performing a second normalization, wherein the second normalization comprises layer normalization of the second intermediate concatenation; and
generating the frame-level multi-tap T-F spatio-temporal-echo filter weights based on the first normalization and the second normalization using the trained neural network model.

7. The method of claim 6, wherein the trained neural network model is a multi-tap multi-head attention based recurrent neural network.

8. The method of claim 1, wherein the predicting of the enhanced target speech based on the frame-level multi-tap T-F spatio-temporal-echo filter weights, the audio data, and the estimated echo.

9. The method of claim 1, wherein the predicting of the enhanced target speech corresponding to the one or more speakers using the frame-level multi-tap T-F spatio-temporal-echo filter weights comprises:
generating the enhanced target speech based on the frame-level multi-tap T-F spatio-temporal-echo filter weights, the audio data, and hermitian operator.

10. An apparatus for generating enhanced target speech from audio data, the apparatus comprising:
at least one memory configured to store computer program code;
at least one processor configured to access the computer program code and operate as instructed by the computer program code, the computer program code including:
first receiving code configured to cause the at least one processor to receive audio data corresponding to one or more speakers;
first generating code configured to cause the at least one processor to generate an estimated target speech, an estimated noise, and an estimated echo simultaneously based on the audio data using a jointly trained complex ratio mask;
first predicting code configured to cause the at least one processor to predict frame-level multi-tap time-frequency (T-F) spatio-temporal-echo filter weights using a first intermediate concatenation generated by concatenating the estimated target speech and the estimated echo and a second intermediate concatenation by concatenating the estimated noise and the estimated echo using a trained neural network model,
wherein the estimated target speech and the estimated echo are jointly modeled using the trained neural network model; and
second predicting code configured to cause the at least one processor to predict enhanced target speech based on the frame-level multi-tap T-F spatio-temporal-echo filter weights.

11. The apparatus of claim 10, wherein the jointly trained complex ratio mask is a multi-headed attention based neural network model, and wherein the same jointly trained complex ratio mask is used to generate the estimated target speech, the estimated noise, and the estimated echo.

12. The apparatus of claim 10, wherein the generation of the estimated target speech, the estimated noise, and the estimated echo using the jointly trained complex ratio mask comprises:
first applying code configured to cause the at least one processor to apply a complex ratio filter to a plurality of nearby time and frequency bins associated with the audio data.

13. The apparatus of claim 10, wherein the generation of the estimated target speech comprises applying a complex ratio filter, wherein the complex ratio filter is based on a speech complex ratio filer as applied to a corresponding shifted version of a plurality of nearby time and frequency bins associated with the audio data.

14. The apparatus of claim 10, wherein the generation of the estimated noise comprises applying a complex ratio filter, wherein the complex ratio filter is based on a noise complex ratio filer as applied to a corresponding shifted version of a plurality of nearby time and frequency bins associated with the audio data.

15. The apparatus of claim 10, wherein the first predicting code comprises:
first performing code configured to cause the at least one processor to perform a first normalization, wherein the first normalization comprises layer normalization of the first intermediate concatenation;

second performing code configured to cause the at least one processor to perform a second normalization, wherein the second normalization comprises layer normalization of the second intermediate concatenation; and second generating code configured to cause the at least one processor to generate the frame-level multi-tap T-F spatio-temporal-echo filter weights based on the first normalization and the second normalization using the trained neural network model.

16. The apparatus of claim 10, wherein the predicting of the enhanced target speech based on the frame-level multi-tap T-F spatio-temporal-echo filter weights, the audio data, and the estimated echo.

17. A non-transitory computer readable medium storing instructions, the instructions comprising: one or more instructions that, when executed by one or more processors of a device for generating enhanced target speech from audio data, cause the one or more processors to:
receive audio data corresponding to one or more speakers;
generate an estimated target speech, an estimated noise, and an estimated echo simultaneously based on the audio data using a jointly trained complex ratio mask;
predict frame-level multi-tap time-frequency (T-F) spatio-temporal-echo filter weights using a first intermediate concatenation generated by concatenating the estimated target speech and the estimated echo and a second intermediate concatenation by concatenating the estimated noise and the estimated echo using a trained neural network model,
wherein the estimated target speech and the estimated echo are jointly modeled using the trained neural network model; and
predict enhanced target speech based on the frame-level multi-tap T-F spatio-temporal-echo filter weights.

18. The non-transitory computer readable medium of claim 17, wherein the one or more instructions further cause the one or more processors to:
perform a first normalization, wherein the first normalization comprises layer normalization of the first intermediate concatenation;
perform a second normalization, wherein the second normalization comprises layer normalization of the second intermediate concatenation; and
generate the frame-level multi-tap T-F spatio-temporal-echo filter weights based on the first normalization and the second normalization using the trained neural network model.

19. The non-transitory computer readable medium of claim 17, wherein the generation of the estimated target speech comprises applying a complex ratio filter, wherein the complex ratio filter is based on a speech complex ratio filer as applied to a corresponding shifted version of a plurality of nearby time and frequency bins associated with the audio data.

20. The non-transitory computer readable medium of claim 17, wherein the predicting of the enhanced target speech based on the frame-level multi-tap T-F spatio-temporal-echo filter weights, the audio data, and the estimated echo.

* * * * *